United States Patent
Katayama et al.

(10) Patent No.: US 10,533,076 B2
(45) Date of Patent: Jan. 14, 2020

(54) RESIN COMPOSITION AND METHOD FOR PRODUCING PEARLY MOLDED BODY

(71) Applicants: TOYO INK SC HOLDINGS CO., LTD., Tokyo (JP); TOYOCOLOR CO., LTD., Tokyo (JP)

(72) Inventors: Kazutaka Katayama, Tokyo (JP); Takashi Ando, Tokyo (JP); Junichi Yoshioka, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 6 days.

(21) Appl. No.: 15/550,028

(22) PCT Filed: Feb. 3, 2016

(86) PCT No.: PCT/JP2016/000561
§ 371 (c)(1),
(2) Date: Aug. 10, 2017

(87) PCT Pub. No.: WO2016/129253
PCT Pub. Date: Aug. 18, 2016

(65) Prior Publication Data
US 2018/0030214 A1 Feb. 1, 2018

(30) Foreign Application Priority Data

Feb. 10, 2015 (JP) .................................. 2015-023793
Aug. 19, 2015 (JP) .................................. 2015-162112

(51) Int. Cl.
*C08L 23/04* (2006.01)
*C08L 23/26* (2006.01)
(Continued)

(52) U.S. Cl.
CPC ................. *C08J 3/22* (2013.01); *C08L 23/02* (2013.01); *C08L 23/26* (2013.01); *C08L 67/00* (2013.01);
(Continued)

(58) Field of Classification Search
None
See application file for complete search history.

(56) References Cited

FOREIGN PATENT DOCUMENTS

JP   S54-032562   3/1979
JP   S58-038747   3/1983
(Continued)

OTHER PUBLICATIONS

Introduction to Industrial Polyethylene—Properties, Catalysts, and Processes. Malpass, D. B. ed., John Wiley & Sons and Scrivener Publishing. 2010. Chapter 1, "Introduction to Polymers of Ethylene". (Year: 2010).*

(Continued)

*Primary Examiner* — Richard A Huhn
(74) *Attorney, Agent, or Firm* — JCIPRNET

(57) ABSTRACT

The purpose of the present invention is to provide: a resin composition which enables the achievement of a pearly molded body having good pearly texture; and a pearly molded body. A resin composition for pearly molded bodies, which is to be melt-kneaded and molded together with an aromatic polyester, and which contains a polyolefin (excluding a low-density polyethylene having a density of 0.92 g/cm³ or less) and an acid-modified polyolefin. It is preferable that the acid-modified polypropylene has an acid value of 1-60 mg KOH/g. It is also preferable that the acid-modified polypropylene is contained in an amount of 1-1,900 parts by mass relative to 100 parts by mass of the polyolefin.

9 Claims, 1 Drawing Sheet

(51) Int. Cl.
*C08L 51/06* (2006.01)
*C08J 3/22* (2006.01)
*C08L 23/02* (2006.01)
*C08L 67/00* (2006.01)
*C08F 10/02* (2006.01)
*C08G 63/183* (2006.01)

(52) U.S. Cl.
CPC ............ *C08F 10/02* (2013.01); *C08G 63/183* (2013.01); *C08L 23/04* (2013.01); *C08L 51/06* (2013.01)

(56) References Cited

FOREIGN PATENT DOCUMENTS

| JP | H02107660 | 4/1990 |
|----|-----------|--------|
| JP | H06184370 | 7/1994 |
| JP | H07-165225 | 6/1995 |
| JP | H11092677 | 4/1999 |
| JP | 2001207045 | 7/2001 |
| JP | 2007-262183 | 10/2007 |
| JP | 2007262183 A * | 10/2007 |
| JP | 2010270309 | 12/2010 |
| JP | 2013-501096 | 1/2013 |

OTHER PUBLICATIONS

"Search Report of Europe Counterpart Application", dated Jun. 25, 2018, p. 1-p. 5.

"International Preliminary Report on Patentability; this report contains the following items :Form PCT/IB/338, PCT/IB/373, PCT/IB/326, PCT/ISA237(cover sheet), PCT/ISA237(Box No. I),PCT/ISA237(Box No. V),", dated Aug. 24, 2017, which is English translation of "Written Opinion of the International Searching Authority", p. 1-p. 14.

"International Search Report (Form PCT/ISA/210)", dated Apr. 19, 2016, with English translation thereof, pp. 1-4.

"Office Action of Japan Counterpart Application," dated Mar. 31, 2015, p. 1-p. 9, with English translation thereof,in which the listed references were cited.

"Office Action of Europe Counterpart Application," dated Jul. 18, 2019, p. 1-p. 5.

* cited by examiner

RESIN COMPOSITION AND METHOD FOR PRODUCING PEARLY MOLDED BODY

CROSS-REFERENCE TO RELATED APPLICATION

This application is a 371 application of the international PCT application serial no. PCT/JP2016/000561, filed on Feb. 3, 2016, which claims the priority benefits of Japan application no. 2015-023793, filed on Feb. 10, 2015 and Japan application no. 2015-162112, filed on Aug. 19, 2015. The entirety of each of the abovementioned patent applications is hereby incorporated by reference herein and made a part of this specification.

TECHNICAL FIELD

The present invention relates to a resin composition that is used to produce a pearl-like molded body.

BACKGROUND ART

Resin molded bodies (hereinafter simply referred to as molded bodies) made of plastics are widely used for members such as various containers and daily commodities. In consideration of formability, mechanical strength, recyclability, and heat resistance, polyolefins and polyesters are used for the molded bodies in many cases. In recent years, since an aesthetically pleasing appearance and good design properties have been required for resin molded bodies and these are major appeal factors when consumers buy products, a luxurious feeling has been conveyed by imparting, for example, pearl-like gloss, to a cap of a shampoo bottle or a beverage bottle.

As a method of imparting pearl-like gloss to a molded body, in addition to a method of applying a pearl-like material such as a titanium-based pearl pigment to a surface of a molded body or kneading it into a molded body, a method of blending polymers having different refractive indexes is known. In the former method, light beams are reflected at a pearl-like gloss (for example, mica) surface, they interfere with each other, and thus pearl-like gloss is exhibited. On the other hand, in the latter method, light beams are reflected and refracted at interfaces between resins having different refractive indexes, they interfere with each other, and thus pearl-like gloss is obtained. In the latter method, a resin composition in which a polyester and a polyolefin are blended is disclosed in Patent document 1.

PRIOR ART DOCUMENT

Patent Document

Patent document 1
Japanese Unexamined Patent Application, No. S54-032562

SUMMARY OF THE INVENTION

Technical Problem

However, in resin compositions of the related art, two types of resin having different refractive indexes are blended and pearl-like gloss is obtained due to a difference in the refractive indexes. However, there are problems in that compatibility between the resins is low and it is difficult to obtain pearl-like texture (for example, gloss, glaze, and a depth).

The present invention provides a resin composition in which it is possible to mold a pearl-like molded body having high pearl-like texture and a pearl-like molded body.

Technical Solution

The resin composition of the present invention is a resin composition for a pearl-like molded body which is melt-kneaded and molded together with an aromatic polyester. The resin composition includes a polyolefin (other than a low-density polyethylene with a density of 0.92 $g/cm^3$ or less) and an acid-modified polyolefin.

Advantageous Effects of Invention

According to the above present invention, when a resin composition including a polyolefin and an acid-modified polyolefin is used for molding a molded body including an aromatic polyester as a main component, the acid-modified polyolefin helps the poorly compatible polyolefin and aromatic polyester become appropriately compatible with each other. Therefore, it is possible to produce a pearl-like molded body having high pearl-like texture.

DESCRIPTION OF THE EMBODIMENTS

A resin composition of the present invention includes a polyolefin (other than a low-density polyethylene with a density of 0.92 $g/cm^3$ or less) and an acid-modified polyolefin. The resin composition is used for molding a pearl-like molded body together with an aromatic polyester. Specifically, in order to mold a pearl-like molded body including an aromatic polyester as a main component, preferably, an aromatic polyester and a resin composition are melted, kneaded, and molded to produce a pearl-like molded body.

Using the resin composition of the present invention, it is possible to produce a pearl-like molded body having pearl-like texture which has been obtained only when a pearl pigment or a pearl-like pigment such as mica has been blended in. That is, the resin composition of the present invention includes a polyolefin having poor compatibility with an aromatic polyester and an acid-modified polyolefin that can help both become appropriately compatible with each other. That is, when the acid-modified polyolefin appropriately enhances compatibility between the aromatic polyester and the polyolefin, a pearl-like molded body having high pearl-like texture is obtained. Here, the present invention does not exclude blending in a pearl-like pigment.

Figure 1:
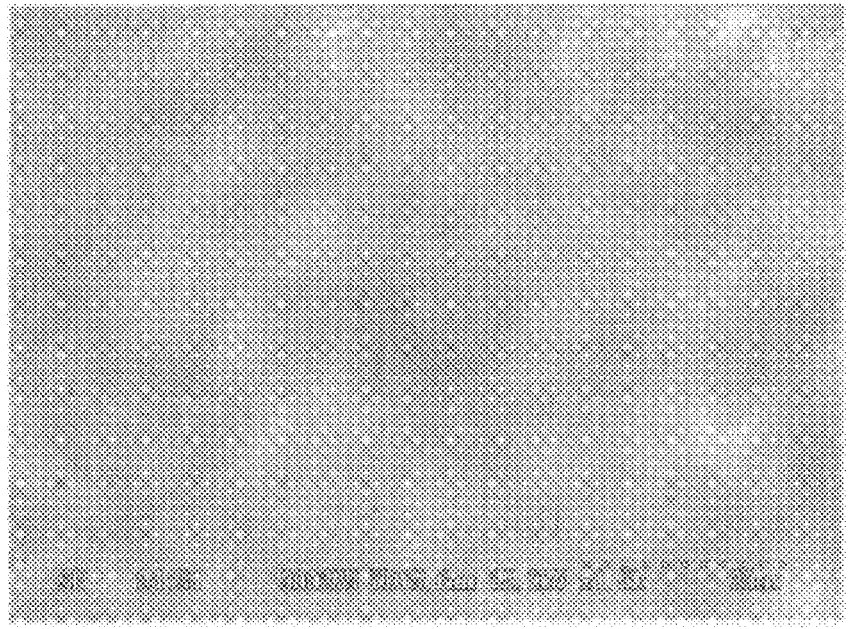
FIG. 1 is an enlarged cross-sectional view of a pearl-like molded body in which a resin composition of the present invention is used.
Figure 2:
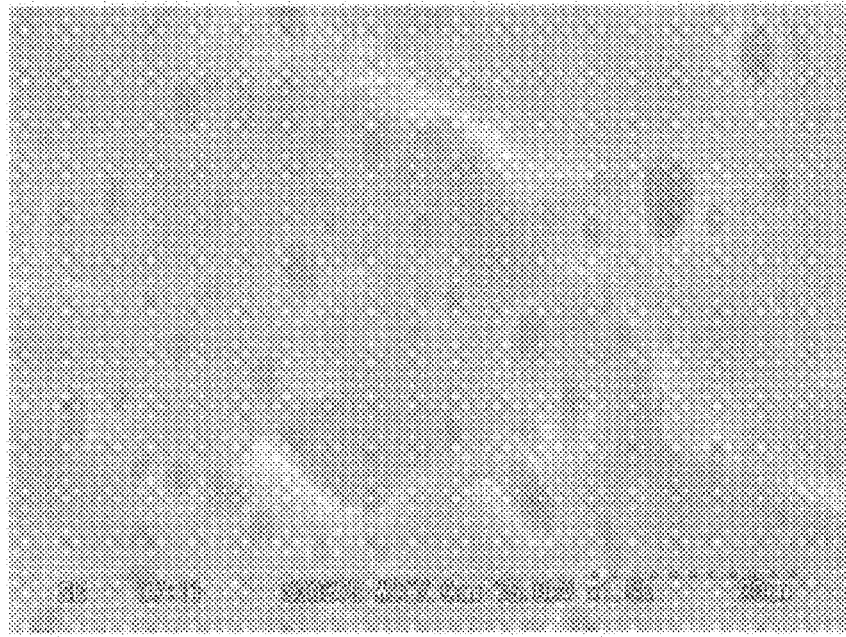
FIG. 2 is an enlarged cross-sectional view of a pearl-like molded body in which no acid-modified polyolefin is used.

When the resin composition of the present invention and the aromatic polyester are melted and kneaded to mold a molded body, a kneaded material extruded from a kneading device is stretched into the shape of the molded body from a state in which the resin composition is highly dispersed in the form of particles in the aromatic polyester. As shown in FIG. 1, during stretching, the resin composition particles are also stretched and appropriately oriented, and thus favorable pearl-like texture is obtained. On the other hand, when the acid-modified polyolefin is not used, since appropriate compatibility between the aromatic polyester and the polyolefin is not obtained, dispersed particles of the resin composition tend to be larger. Thus, as shown in FIG. 2, since polyolefin particles are not appropriately oriented during stretching, favorable pearl-like texture is not obtained. Here, FIG. 1 is only an example of forms of the present invention and the present invention is not limited to FIG. 1.

<Polyolefin>

In the present invention, the polyolefin includes a homopolymer such as ethylene, propylene, butane, and pentene or a copolymer thereof as a main component.

Examples of the polyolefin include polyethylene, polypropylene, an ethylene-vinyl acetate copolymer, an ethylene-methyl acrylate copolymer, an ethylene-methyl methacrylate copolymer, an ethylene-ethyl acrylate copolymer, a propylene-vinyl acetate copolymer, a propylene-methyl acrylate copolymer, a propylene-methyl methacrylate copolymer, a propylene-ethyl acrylate copolymer, polybutene, a poly-3-methyl-1-butene copolymer, and a poly-4-methyl-1-pentene copolymer. Among them, polypropylene and polyethylene which are inexpensive and excellent in terms of processability, and widely used in various industrial parts and home appliances are preferable. Here, the polyolefin does not include a low-density polyethylene with a density of 0.92 g/cm$^3$ or less.

Examples of the polypropylene include a propylene homopolymer, an ethylene-propylene copolymer, an ethylene-propylene-ethylene propylene rubber copolymer, and a polypropylene obtained using a metallocene compound as a polymerization catalyst. Among them, an ethylene-propylene copolymer being little influenced by light scattering (white blur) and having high transparency in a crystal part having a low degree of crystallinity are preferable. When an ethylene-propylene copolymer is used, an optical interference effect is likely to exhibited not only on a surface part of the molded body but also inside the molded body when the molded body is molded, and pearl-like texture of the molded body is enhanced.

Examples of the polyethylene include a high-density polyethylene, a low-density polyethylene, an ultra low-density polyethylene, a linear low-density polyethylene, an ultra high molecular weight polyethylene, and a polyethylene obtained using a metallocene compound as a polymerization catalyst. Among them, a polyethylene other than a low-density polyethylene with a density of 0.92 g/cm$^3$ or less is preferable. When the resin composition of the present invention is prepared using a low-density polyethylene with a density of 0.92 g/cm$^3$ or less, and is melt-kneaded with an aromatic polyester to mold a molded body, the low-density polyethylene deteriorates due to heat, and an appearance, physical properties, and the like of the molded body tend to deteriorate.

These polyolefins can be used alone or in combination of two or more thereof.

In addition, a D line refractive index (JIS K 7142) of a polyolefin at 23° C. is preferably 1.35 to 1.65, more preferably 1.40 to 1.60, and most preferably 1.45 to 1.55. When the D line refractive index is in a range of 1.35 to 1.65, pearl-like gloss is easily obtained.

<Acid-Modified Polyolefin>

In the present invention, the acid-modified polyolefin is used to realize appropriate compatibility between an aromatic polyester and a polyolefin. For this purpose, the acid-modified polyolefin includes a characteristic group derived from an organic acid. As the characteristic group, a sulfo group, a carboxyl group, a phosphate group, a hydroxy group, a thiol group, and the like are preferable, and a saturated or unsaturated carboxylic acid including a carboxyl group is preferable. In addition, an acid anhydride group is preferable. The acid-modified polyolefin can be synthesized by reacting (modifying) a polyolefin with an organic acid including the characteristic group in the presence of, for example, a peroxide.

Examples of the saturated or unsaturated carboxylic acid including a carboxyl group include formic acid, acetic acid, propionic acid, acrylic acid, methacrylic acid, oxalic acid, malonic acid, succinic acid, maleic acid, fumaric acid, phthalic acid, and terephthalic acid. Examples of the organic acid including an acid anhydride group include maleic anhydride, acetic anhydride, propionic anhydride, succinic anhydride, and phthalic anhydride.

When the acid-modified polyolefin has an acid value, the acid value is preferably 1 to 60 mg KOH/g, more preferably 1 to 53 mg KOH/g, and most preferably 1 to 45 mg KOH/g. When the acid value is 1 to 60 mg KOH/g, appropriate compatibility between a polyolefin and a polyester is easily obtained, and pearl-like texture is further enhanced. Here, when the acid value is 1 mg KOH/g or more, appropriate compatibility is easily obtained. In addition, when the acid value is 60 mg KOH/g or less, it is easy to mold the resin composition into a pellet form.

As described above, the acid-modified polyolefin is preferably synthesized by a method of modifying a polyolefin with an organic acid including a characteristic group in the presence of a peroxide. As a polyolefin before modification, the above-described polyolefins may be exemplified, and particularly, polypropylene is preferable. Examples of polypropylene before modification include a propylene homopolymer, an ethylene-propylene copolymer, an ethylene-propylene-ethylene propylene rubber copolymer, and a polypropylene copolymer using a metallocene compound as a polymerization catalyst.

The acid-modified polyolefin is preferably included at 1 to 1900 parts by mass and more preferably at 3 to 1400 parts by mass with respect to 100 parts by mass of a polyolefin. When the acid-modified polyolefin is included at 1 to 1900 parts by mass, appropriate compatibility between an aromatic polyester and a polyolefin is easily obtained, and pearl-like gloss is easily obtained.

The acid-modified polyolefins can be used alone or in combination of two or more thereof.

<Aromatic Polyester>

The aromatic polyester is a resin serving as a main component of a pearl-like molded body, and is an ester of a dicarboxylic acid component and a diol component. An aromatic ring is often included in a dicarboxylic acid component or may be included in a diol component.

Examples of the dicarboxylic acid component include terephthalic acid, dimethyl terephthalate, 2,6-naphthalene dicarboxylic acid, and naphthalene dicarboxylic acid.

Examples of the diol component include ethylene glycol, butylene glycol, 1,3-propane diol, 1,4-butane diol, and 1,4-cyclohexane dimethanol.

The aromatic polyester is preferably a resin other than a polyester elastomer. Specifically, an aromatic polyester other than a polyester elastomer having a flexural modulus at 23° C. of less than 2000 MPa is preferable. Thus, when the resin composition is molded into, for example, a bottle shape, it is possible to easily obtain both mechanical characteristics and transparency.

Examples of the aromatic polyester include polyethylene terephthalate, polybutylene terephthalate, polymethylene terephthalate, polyethylene naphthalate, polybutylene naphthalate, and polycyclohexane terephthalate. Among them, polyethylene terephthalate having high transparency and excellent recyclability, cost benefits, and processability is preferable.

Examples of polyethylene terephthalates include crystalline polyethylene terephthalate (C-PET), amorphous polyethylene terephthalate (A-PET), glycol-modified polyester (PET-G), and glass reinforced polyethylene terephthalate.

In addition, the D line refractive index (JIS K 7142) at 23° C. of the aromatic polyester is preferably 1.4 to 1.8, more preferably 1.5 to 1.7, and most preferably 1.55 to 1.65. When the D line refractive index is in a range of 1.4 to 1.8, pearl-like gloss is easily obtained.

<Coloring Agent>

The resin composition can include a coloring agent. Accordingly, the pearl-like molded body can be colored in a desired color. As the coloring agent, a pigment and a dye are preferable. Examples of the pigment include a black pigment and a chromatic pigment.

Examples of the black pigment include an organic black pigment such as aniline black, anthraquinone black, and perylene black; and an inorganic black pigment such as carbon black, lamp black, graphite, fullerene, carbon nanotubes, magnetite, an iron-titanium composite oxide, a cobalt oxide, manganese dioxide, zinc sulfide, a copper-chromium composite oxide, a tin-antimony composite oxide, a titanium-vanadium-antimony composite oxide, a cobalt-nickel composite oxide, a manganese-iron composite oxide, an iron-cobalt-chromium composite oxide, a copper-chromium composite oxide, an iron-cobalt composite oxide, a chromium-iron-nickel composite oxide, molybdenum disulfide, a black titanium dioxide, a titanium nitride, and a chromium oxide.

As the chromatic pigment, a pigment such as a red pigment, a yellow pigment, an orange pigment, a violet pigment, a blue pigment, a green pigment, a brown pigment is preferable.

Examples of the red pigment include a naphthol pigment, an azo pigment, a quinacridone pigment, an anthraquinone pigment, a perylene pigment, and a diketopyrrolopyrrole pigment.

Examples of the yellow pigment include an organic pigment such as an azo pigment, an anthraquinone pigment, an isoindolinone pigment, a quinophthalone pigment, and a benzimidazolone pigment; and an inorganic pigment such as a titanium-nickel-antimony composite oxide and a zinc-iron composite oxide.

Examples of the orange pigment include a naphthol pigment, an azo pigment, a benzimidazolone pigment, a quinacridone pigment, and a diketrolopyrrole pigment.

Examples of the purple pigment include an azo pigment, a rhodamine pigment, a quinacridone pigment, a carbazole pigment, a perylene pigment, and a quinacridone pigment.

Examples of the blue pigment include an organic pigment such as a phthalocyanine pigment; and an inorganic pigment such as a cobalt-aluminum composite oxide, a cobalt-aluminum-chromium composite oxide, and an ultramarine blue.

Examples of the green pigment include an organic pigment such as a phthalocyanine pigment and an azo pigment; and an inorganic pigment such as a chromium oxide, a cobalt-chromium-aluminum composite oxide, and a cobalt-nickel-zinc composite oxide.

Examples of the brown pigment include an organic pigment such as an azo pigment and a benzimidazolone pigment; and an inorganic pigment such as an iron oxide, and a titanium-chromium-antimony composite oxide.

The average primary particle size of the pigment is preferably 0.01 to 5 μm, and more preferably 0.01 to 3 μm. When the average primary particle size of the pigment is in an appropriate range, the dispersibility of the pigment and the color tone of the pearl-like molded body are further enhanced. Here, the average primary particle size of the pigment is an arithmetic mean value of equivalent circle diameters calculated by enlarging and observing particles in images (about 20 to 50 images) of a sample prepared by a sprinkling method under a transmission electron microscope (commercially available from JEOL Ltd.) at a magnification of about 50,000 to 1,000,000 according to JISZ8901-2006 "Test powder and test particles" 5.4.4 particle size distribution (c) based on microscopy.

As the dye, an acidic dye, a direct dye, a basic dye, a salt-forming dye, an oil-soluble dye, a dispersion dye, a reactive dye, a mordant dye, a vat dye, and a sulfur dye are preferable.

Examples of the acidic dye include an anthraquinone acid dye, a phthalocyanine acidic dye, a quinoline acidic dye, an azine acidic dye, an indigoid acidic dye, a xanthene acid dye, and a triphenylmethane acidic dye.

Examples of the direct dye include an azo direct dye, a thiazole direct dye, an anthraquinone direct dye, an oxazine direct dye, and a phthalocyanine direct dye.

Examples of the basic dye include an azo basic dye, an azine basic dye, an acridine basic dye, a methine basic dye, a thiazole basic dye, a thiazine basic dye, an oxazine basic dye, an anthraquinone basic dye, a xanthine basic dye, and a triarylmethane basic dye.

Examples of the oil-soluble dye include an anthraquinone oil-soluble dye, a phthalocyanine oil-soluble dye, a quinoline oil-soluble dye, an azine oil-soluble dye, an indigoid oil-soluble dye, a methine oil-soluble dye, an azo oil-soluble dye, an aminoketone oil-soluble dye, a xanthine oil-soluble dye, and a triphenylmethane oil-soluble dye.

Examples of the dispersion dye include an anthraquinone dispersion dye, a quinoline dispersion dye, an indigoid dispersion dye, a quinophthalone dispersion dye, a methine dispersion dye, an azo dispersion dye, an aminoketone dispersion dye, and a xanthine dispersion dye.

In addition, a salt-forming dye such as a salt former of an above acidic dye and a cationic compound, a salt former of an above basic dye and an anionic compound, or a salt former of an acidic dye and a basic dye can be used.

The coloring agents can be used alone or in combination of two or more thereof.

In addition, in the present invention, in order to obtain a pearl-like molded body having favorable pearl-like gloss, the coloring agent can be used as follows.

That is, the resin composition preferably includes at least one of a black coloring agent having an average reflectance of 10% or less at a wavelength of 380 to 750 nm and a chromatic coloring agent showing a peak with a maximum reflectance of 3% or more at a wavelength of 380 run to 500 nm. When at least one coloring agent exhibiting these reflectance characteristics is included, the texture (glaze and depth) of the molded body obtained by molding the resin composition can be enhanced and the appearance can be further enhanced. This is because pearl-like gloss obtained in the appearance of a molded body obtained by molding a resin composition into which no coloring agent is blended is white and also slightly bluish due to an optical interference effect. That is, when a black coloring agent having an average reflectance of 10% or less at a wavelength of 380 to 750 run is used, a white pearl tone is further highlighted. On the other hand, when a chromatic coloring agent showing a peak with a maximum reflectance of 3% or more at a wavelength of 380 nm to 500 run is used, it is thought that a coloring effect of the chromatic coloring agent is enhanced due to a bluish component of the pearl-like gloss, which results in enhancement of the texture.

Here, the reflectance of the pigment can be obtained by measuring a reflectance of a sheet that is produced by kneading a pigment into polypropylene. For example, a measurement sample may be obtained when 0.25 parts by mass of a pigment is mixed with 100 parts by mass of polypropylene (random propylene copolymer, J226T commercially available from Prime Polymer Co., Ltd.), the mixture is melt-kneaded for 5 minutes using two rollers heated to 180° C., and a pressed sheet with a thickness 2 mm is then produced using a press molding machine heated to 180° C. In addition, the reflectance indicates a diffuse reflectance of the measurement sample when a diffuse reflectance of a standard white board (barium sulfate) is set as 100% at wavelengths of 300 to 800 nm. In addition, a UV-3150 (commercially available from Shimadzu Corporation) is used as a reflectance measurement device. Here, "average reflectance of 10% or less" described herein is defined as an arithmetic mean value of reflectances of wavelengths (at every 1 nm) of 380 to 750 nm. In addition, the "peak with a maximum reflectance of 3% or more" is defined as a maximum peak that appears in a range of a wavelength of 380 to 500 nm and is at least 3% higher than the lowest value (the minimum value is a base line) of the reflectance at a wavelength of 300 to 800 nm.

In addition, the reflectance of the dye can be obtained by measuring a reflectance of an injection plate that is produced by kneading a dye into polyethylene terephthalate. Further, the reflectance of the dye is obtained in the same manner as the reflectance of the pigment.

In addition, the refractive index of the coloring agent is preferably close to the refractive index of a polyester and a polyolefin. More specifically, the D line refractive index (JIS K 7142) at 23° C. is preferably 1.35 to 1.75. When the D line refractive index is in this range, pearl-like gloss is further enhanced.

The coloring agent is preferably included at 0.0001 to 20 mass % and more preferably at 0.001 to 10 mass % with respect to 100 mass % of the resin composition. When the coloring agent is included in an appropriate range, it is possible to obtain a pearl-like molded body having a color tone and high pearl-like texture.

The resin composition of the present invention can further include an inorganic filler as necessary in order to improve a property such as impact resistance, an antibacterial property, a gas barrier property, conductivity, magnetism, a piezoelectric property, a vibration damping property, a sound insulating property, a sliding property, an electromagnetic wave absorption property, a flame retardant property, a dehydrating property, a deodorizing property, an anti-blocking property, an oil absorption property, a water absorption property, and formability.

Examples of the inorganic filler include carbon fibers, glass fibers, glass flakes, zeolite, mica, graphite, metal powder, ferrite, alumina, barium titanate, potassium titanate, bariumsulfate, Teflon (registered trademark) powder, talc, charcoal powder, carbon nanotubes (CNT), carbon microcoils (CMC), antimony oxide, aluminum hydroxide, magnesium hydroxide, hydrotalcite, calcium oxide, silica, and calcium carbonate.

The inorganic filler is preferably included at 0.01 to 20 mass % with respect to 100 mass % of the pearl-like molded body. When the inorganic filler is included in an appropriate range, it is easy to maintain pearl-like texture while obtaining characteristics of the inorganic filler.

In addition, known additives, for example, a leveling agent, a pigment dispersant, an ultraviolet absorber, an antioxidant, a viscosity modifier, a light resistance stabilizer, a metal deactivator, a peroxide decomposer, a processing stabilizer, a nucleating agent, a crystallization accelerator, a crystallization retarder, a gelation inhibitor, a filler, a reinforcing agent, a plasticizer, a lubricant, a flame retardant, a rust inhibitor, a fluorescent whitening agent, a fluidity modifier, and an antistatic agent, can be appropriately selected and blended into the resin composition of the present invention.

As a method of producing the resin composition of the present invention, a polyolefin and an acid-modified polyolefin, and other optional components as necessary can be mixed or melt-kneaded for production. The resin composition can be produced into forms of pellets, powder, granules, beads, or the like. Here, when a coloring agent is blended in during melt-kneading, the pearl-like molded body can be colored to a desired color tone.

Known devices, for example, a Henschel mixer, a tumbler, a disperser, a kneader, a roll mill, a super mixer, a vertical granulator, a high speed mixer, a Pharmatrix, a ball mill, a steel mill, a sand mill, a vibrating mill, or an attritor, can be used for mixing.

Known devices, for example, a Bunbury mixer, a twin-screw extruder, a single-screw extruder, a rotor type twin-screw kneading machine, a kneader, or the like, can be used for melt-kneading.

A melt-kneading temperature is preferably 100 to 240° C., and more preferably 160 to 235° C. When melt-kneading is performed at 100 to 240° C., it is possible to easily prevent discoloration and the like of the pearl-like molded body.

The kneaded resin composition can be molded into any form of pellets, powder, granules, beads, and the like.

In addition, when an acid-modified polyolefin having an acid value of 1 to 15 mg KOH/g is used as another embodiment of the resin composition of the present invention, an acid-modified polyolefin and an aromatic polyester can be blended (melt-kneaded) without blending in a polyolefin to produce a pearl-like molded body having high pearl-like texture. In this case, preferably, the acid-modified polypropylene is blended in at 0.1 to 20 parts by mass with respect to 100 parts by mass of the aromatic polyester. Such a resin composition is referred to as a resin composition for a pearl-like molded body.

In a method for producing a pearl-like molded body of the present invention, it is possible to produce a pearl-like molded body by melt-kneading and molding a resin composition including a polyolefin (other than a low-density polyethylene with a density of 0.92 g/cm$^3$ or less) and an acid-modified polyolefin and an aromatic polyester (first production method). In addition, in another method of producing a pearl-like molded body, it is possible to produce a pearl-like molded body by preparing, melt-kneading, and molding an aromatic polyester, a polyolefin, and an acid-modified polyolefin (second production method).

When the pearl-like molded body of the present invention is produced according to the first production method, this is preferable because a melt-kneading time can be shortened, and thus it is possible to prevent yellowing of the acid-modified polyolefin due to melt-kneading at a high temperature.

A melt-kneading temperature is preferably 200 to 370° C., and more preferably 220 to 350° C. In addition, a device described above can be used for melt-kneading.

In addition, when the pearl-like molded body includes a pigment as a coloring agent, preferably, a polyolefin and an acid-modified polyolefin are blended together with a pigment and are melt-kneaded to produce a resin composition. On the other hand, when a dye is used as a coloring agent, it is difficult to mix the dye with a polyolefin. Thus, preferably, a mixture including a polyolefin and an acid-modified polyolefin and a coloring composition including an aromatic polyester and a dye are prepared, and then an aromatic polyester for dilution, the mixture, and the coloring composition are blended, melt-kneaded, and molded to produce a pearl-like molded body. Here, when a pigment is used, a pearl-like molded body may be produced according to the same method as the dye. When a coloring agent is used, a resin composition is preferably produced via a coloring composition since it is possible to prevent bleeding out of the coloring agent.

The coloring composition is preferably included at 0.0001 to 300 parts by mass and more preferably at 0.001 to 200 parts by mass with respect to 100 parts by mass of the resin component (such as an aromatic polyester, a polyolefin, and an acid-modified polyolefin) included in the pearl-like molded body. When the coloring composition is included in this range, a pearl-like molded body having more favorable pearl-like texture is obtained.

In the present invention, as a molding method for obtaining a pearl-like molded body, film molding (T die film molding, inflation molding, calender molding, biaxially stretching molding, and the like), injection molding, blow molding (biaxially stretching blow molding, direct blow molding, and the like), and the like are preferable. These molding methods are preferable because a resin composition that is highly dispersed in the form of particles in the aromatic polyester is stretched or oriented, and thus pearl-like texture is further enhanced. In other words, when the resin composition in the aromatic polyester is stretched or orientated by molding, the initially spherical resin composition is changed to an elliptical shape. Since the elliptical shape has a flat surface that is larger than the spherical shape, an effect of light interference between the resin composition and the aromatic polyester is strengthened, and since a spherical surface which causes irregular reflection is smaller, pearl-like texture without color unevenness is easily obtained.

Here, among the above molding methods, biaxially stretching film molding, injection molding, biaxially stretching blow molding, and direct blow molding are preferable because a drawing rate is high and high orientation is easily obtained. Here, the film molding includes single layer film molding using a single film and multilayer film molding using a film in which two or more film layers are laminated.

A final blending ratio between materials of the pearl-like molded body is preferably 0.1 to 20 parts by mass of the polyolefin and 0.1 to 20 parts by mass of the acid-modified polyolefin with respect to 100 parts by mass of the aromatic polyester.

The pearl-like molded body of the present invention can allow obtaining of pearl-like texture that it is possible to obtain only when a pearl pigment or a pearl-like pigment such as mica is blended in, in the related art. The pearl-like molded body can be widely used for not only general ornaments and cosmetic containers for which excellent texture is required but also exterior parts of electronic devices such as various home appliances, personal computers, smartphones, tablet terminals, and digital cameras and interior and exterior parts of house building components, ships, aircrafts, and vehicles.

EXAMPLES

The present invention will be described below in further detail with reference to examples. The present invention is not limited to such examples and includes other modifications without departing from the spirit and scope of the present invention. Here, the blending ratio in tables is represented by parts by mass with respect to 100 parts by mass of a polyolefin (A). In addition, in formulations in tables, only formulations of resin compositions are shown, and formulations of aromatic polyesters and the like are not shown.

Materials used in the examples are as follows.

[Polyolefins]

(A-1): Ethylene-propylene copolymer (J226T commercially available from Prime Polymer Co., Ltd.)

(A-2): Propylene homopolymer (F-704NP commercially available from Prime Polymer Co., Ltd.)

(A-3): Ethylene-propylene-ethylene propylene rubber copolymer (J715M commercially available from Prime Polymer Co., Ltd.)

(A-4): High-density polyethylene (NOVATEC HJ550 commercially available from Japan Polyethylene Corporation, density: 0.96 g/cm$^3$)

(A-5): Low-density polyethylene (Mirason 50 commercially available from KURARAY Co. Ltd., density: 0.92 g/cm$^3$)

[Acid-Modified Polyolefins]

(B-1): Maleic anhydride-modified polypropylene (AD-MER QB550 commercially available from Mitsui Chemicals, Inc. acid value: 2.3 mg KOH/g)

(B-2): Maleic anhydride-modified polypropylene (AD-MER QF500 commercially available from Mitsui Chemicals, Inc., acid value: 3.1 mg KOH/g)

(B-3): Maleic anhydride-modified polypropylene (MODIC P-908 commercially available from Mitsubishi Chemical Corporation, acid value: 12.8 mg KOH/g)

(B-4): Maleic anhydride-modified polypropylene (Yumex 303 commercially available from Sanyo Chemical Industries, Ltd., acid value: 17 mg KOH/g)

(B-5): Maleic anhydride-modified polypropylene (Yumex 1010 commercially available from Sanyo Chemical Industries, Ltd., acid value: 52 mg KOH/g)

(B-6): Maleic anhydride modified ethylene propylene rubber (TAFMER MP0610 commercially available from Mitsui Chemicals, Inc., acid value: 4.5 mg KOH/g)

[Coloring Agents]

(C-1): Black inorganic pigment (carbon black C.I. Pigment Black 7, average reflectance: 1.6%, average primary particle size: 0.024 μm)

(C-2): Blue organic pigment (β type phthalocyanine blue C.I. Pigment Blue 15:3, reflective maximum wavelength: 450 nm, maximum reflectance: 10.5%, average primary particle size: 0.1 μm)

(C-3): Red organic pigment (quinacridone red C.I. Pigment Red 122, reflective maximum wavelength: 402 nm, maximum reflectance: 5%, average primary particle size: 0.12 μm)

(C-4): Yellow organic pigment (disazo yellow C.I. Pigment Yellow 180, no reflection maximum peak at 380 to 500 nm, average primary particle size: 0.23 μm)

(C-5): Blue inorganic pigment (ultramarine blue C.I. Pigment Blue 29, reflective maximum wavelength: 424 nm, maximum reflectance: 9%, average primary particle size: 2 μm)

Here, the average reflectance indicates an arithmetic mean value of diffuse reflectances at wavelengths of 380 to 750 run. The maximum reflectance indicates a diffuse reflectance of a maximum peak that appears in a wavelength range of 380 to 500 nm and is at least 3% higher than the lowest value (base line) in the reflectance at a wavelength of 300 to 800 nm.

(C-6): Pearl pigment (Iriodin 120 Lustre Satin commercially available from Merck, particle size of 5 μm to 25 μm, titanium oxide-coated amount 38%)

[Others]

(D-1): Zinc stearate/calcium stearate mixture (mixing ratio: 1/1)

Example 1

(1) Production of Resin Composition (A-1), (B-1), (C-1), and (D-1) were stirred and mixed at 100 parts by mass, 50 parts by mass, 0.1 parts by mass, and 0.01 parts by mass, respectively, using a stirring blade at a rotational speed of 300 rpm for 3 minutes to obtain a mixture. The mixture was put into a twin-screw extruder (commercially available from Nippon Placon Co., Ltd.) at a set temperature of 220° C., and melt-kneaded and granulated to obtain a pellet-like resin composition.

(2) Film Molding

An aromatic polyester (polyethylene terephthalate, MITSUI PET SA135 commercially available from Mitsui Chemicals, Inc.) and the obtained resin composition were put into a T die film forming machine at a set cylinder temperature of 270° C. and a cooling roll temperature of 60° C. at 100 parts by mass and 10 parts by mass respectively, and film molding was performed while stretching a kneaded material extruded to a size of 300 μm in thickness and 150 mm in width to obtain a film-like molded body (100 μm in thickness, 100 mm in width, and 200 m in length).

(3) Injection Molding

The aromatic polyester (MITSUI PET SA135) and the resin composition obtained in Example 1 were put into an injection molding machine at a set cylinder temperature of 270° C. and a mold temperature regulation temperature of 20° C. at 100 parts by mass and 10 parts by mass, respectively, and a plate (injection molded body) with a length of 10 cm, a width of 6 cm, and a thickness of 3 mm was molded.

(4) Biaxial Stretch Blow Molding

The aromatic polyester (MITSUI PET SA135) and the resin composition obtained in Example 1 were put into a biaxially stretching blow molding machine at a set cylinder temperature of 270° C. at 100 parts by mass and 10 parts by mass, respectively, to obtain a preform (2.5 cm in diameter, 7.5 cm in length, and 9 mm in thickness). The obtained preform was kept at 120° C., and was stretched in a mold for blowing at a regulated mold temperature of 15° C. to obtain a cylindrical blow molded body with a diameter of 7.5 cm, a length of 15 cm, and a thickness of 3 mm.

Here, only pearl-like texture of the injection molded body and the blow molded body was evaluated.

Reference Example

As a comparison target for pearl-like gloss and gloss texture, a resin composition in which the pearl pigment (C-6) was blended at 2 parts by mass with 100 parts by mass of the aromatic polyester (MITSUI PET SA135) was used to obtain a film-like molded body in the same manner as in Example 1.

Examples 2 to 32 and Comparative Example 1

Resin compositions and film-like molded bodies thereof were obtained in the same manner as in Example 1 except that materials and amounts blended in in Example 1 were changed as shown in Tables 1 to 4.

Comparative Example 2

A resin composition and a film-like molded body thereof were obtained in the same manner as in Example 1 except that the aromatic polyester of Example 1 was changed to a polyester elastomer (100 parts by mass, PRIMALLOY, B1600 aliphatic polyester, commercially available from Mitsubishi Chemical Corporation).

Comparative Example 3

A resin composition and a film-like molded body thereof were obtained in the same manner as in Example 1 except that materials and amounts blended in in Example 1 were changed as shown in Table 4.

The obtained molded bodies were tested according to the following methods. Evaluation results are shown in Tables 1 to 4.

<Pearl-Like Gloss (Perception of Luminosity)>

10 testers visually evaluated the superiority or inferiority of a perception of luminosity of pearl-like gloss on surfaces of the obtained film-like molded bodies with respect to the film-like molded body in which a pearl pigment was used serving as the reference example. Here, evaluation criteria were as follows.

5: 8 or more testers had a perception better than that of the reference example. Excellent.

3: 6 to 7 testers had a perception equal to or better than that of the reference example. Practical.

1: 5 or less testers had a perception equal to or better than that of the reference example. Not practical.

<Gloss Texture>

10 testers visually evaluated texture of pearl-like gloss on surfaces of the obtained film-like molded bodies in consideration of glaze and a depth with respect to the film-like molded body in which a pearl pigment was used serving as the reference example. Here, evaluation criteria were as follows.

5: 8 or more testers had a perception equal to or better than that of the reference example. Excellent.

3: 6 to 7 testers had a perception equal to or better than that of the reference example. Practical.

1: 5 or less testers had a perception equal to or better than that of the reference example. Not practical.

<Color Unevenness>

The color unevenness on surfaces of the molded bodies was measured using a computer color matching system (CCM) (AUCOLOR VP-2 commercially available from KURABO Industries Ltd.), and ΔE values were measured at arbitrary five points under conditions of a standard light source D-65 and diffused lighting at 10° and averaged. Here, evaluation criteria were as follows.

4: Less than 0.3. Excellent

3: 0.3 or more and less than 0.5. Good.

2: 0.5 or more and less than 1. Practical.

1: 1 or more. Not practical.

<Foreign Substances Evaluation>

When the film-like molded body was produced as described above, samples from 191 m to 200 in after the production started were sampled. It was observed whether there were foreign substances having a size in 40 μm or more in diameter generated on the surface of the film under a digital microscope (digital microscope, VHS-100 commercially available from KEYENCE Corporation). Foreign substances were evaluated because, when compatibility between the resin composition and the aromatic polyester is low, foreign substances easily accumulate with the progress of the molded length m and easily accumulate in the final products in the molded length in. Here, evaluation criteria were as follows.

4: The same number as the number of pieces of foreign substances generated when a molded body was produced using only an aromatic polyester or smaller. The number of pieces of foreign substances was 10 pieces or less/m, excellent.

3: The number of foreign substances was 11 to 25 pieces/m, good.

2: The number of foreign substances was 26 to 40 pieces/m, practical

1: The number of foreign substances was 41 pieces/in or more, not practical.

<Dispersion Evaluation>

A test piece obtained by partially cutting the obtained film-like molded body was cooled with liquid nitrogen and cut. A cross section thereof was observed under a scanning electron microscope (field emission scanning electron microscope, S-4300 commercially available from Hitachi, Ltd. 1500 times field of view). The shorter diameter of particles of the resin composition of the present invention dispersed in elliptical forms or circular forms in the aromatic polyester was measured at 30 places at random. When the dispersed particles had a smaller diameter, pearl-like gloss and gloss texture of the resin composition were more likely to be enhanced. Here, evaluation criteria were as follows. In addition, when the dispersed particles had elliptical shapes with a long diameter and a short diameter, the short diameter was used as the diameter.

4: The average shorter diameter of dispersed particles was less than 2 μm, excellent.

3: The average shorter diameter of dispersed particles was 2 μm or more and less than 3 μm, good.

2: The average shorter diameter of dispersed particles was 3 μm or more and less than 5 μm, practical.

1: The average shorter diameter of dispersed particles was 5 μm or more, not practical.

TABLE 1

| | | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|---|
| Formulation | Polyolefin (A) | A-1 | 100 | | | | 100 | | | | 100 | 100 | 100 |
| | | A-2 | | 100 | | | | 100 | | | | | |
| | | A-3 | | | 100 | | | | 100 | | | | |
| | | A-4 | | | | 100 | | | | 100 | | | |
| | | A-5 | | | | | | | | | | | |
| | Acid-modified polyolefin (B) | B-1 | 50 | 50 | 50 | 50 | | | | | | | |
| | | B-2 | | | | | | | | | 50 | | |
| | | B-3 | | | | | | | | | | 50 | |
| | | B-4 | | | | | 50 | 50 | 50 | 50 | | | |
| | | B-5 | | | | | | | | | | | 50 |
| | | B-6 | | | | | | | | | | | |
| | Coloring agent (C) | C-1 | 0.1 | 0.1 | 0.1 | 0.1 | 0.1 | 0.1 | 0.1 | 0.1 | 0.1 | 0.1 | 0.1 |
| | | C-2 | | | | | | | | | | | |
| | | C-3 | | | | | | | | | | | |
| | | C-4 | | | | | | | | | | | |
| | | C-5 | | | | | | | | | | | |
| | | C-6 | | | | | | | | | | | |
| | Other (D) | D-1 | 0.01 | 0.01 | 0.01 | 0.01 | 0.01 | 0.01 | 0.01 | 0.01 | 0.01 | 0.01 | 0.01 |
| Evaluation | Film-like molded body | Perception of luminosity | 5 | 5 | 3 | 3 | 5 | 5 | 3 | 3 | 5 | 5 | 5 |
| | | Gloss texture | 3 | 3 | 3 | 3 | 5 | 5 | 5 | 5 | 5 | 5 | 5 |
| | | Color unevenness | 4 | 4 | 4 | 4 | 4 | 4 | 4 | 4 | 4 | 4 | 4 |
| | | Foreign substances | 4 | 4 | 4 | 4 | 4 | 4 | 4 | 4 | 4 | 4 | 2 |
| | | Dispersion | 3 | 3 | 3 | 3 | 4 | 4 | 4 | 4 | 4 | 4 | 3 |
| | Injection molded body | Gloss texture | 3 | 3 | 3 | 3 | 5 | 5 | 5 | 5 | 5 | 5 | 5 |
| | Blow molded body | Gloss texture | 3 | 3 | 3 | 3 | 5 | 5 | 5 | 5 | 5 | 5 | 5 |

TABLE 2

| | | | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| Formulation | Polyolefin (A) | A-1 | 100 | | | | 100 | | | | 100 | |
| | | A-2 | | | | | | 100 | | | | 100 |
| | | A-3 | | 100 | 100 | 100 | | | 100 | | | |
| | | A-4 | | | | | | | | 100 | | |

TABLE 2-continued

|  |  |  | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
|  | Acid-modified polyolefin (B) | A-5 |  |  |  |  |  |  |  |  |  |  |
|  |  | B-1 |  |  |  |  |  |  |  |  |  |  |
|  |  | B-2 |  | 50 |  |  | 5 | 5 | 5 | 5 |  |  |
|  |  | B-3 |  |  | 50 |  |  |  |  |  |  |  |
|  |  | B-4 |  |  |  |  |  |  |  |  |  |  |
|  |  | B-5 |  |  |  | 50 |  |  |  |  | 1300 | 1300 |
|  |  | B-6 | 50 |  |  |  |  |  |  |  |  |  |
|  | Coloring agent (C) | C-1 | 0.1 | 0.1 | 0.1 | 0.1 | 0.1 | 0.1 | 0.1 | 0.1 | 0.1 | 0.1 |
|  |  | C-2 |  |  |  |  |  |  |  |  |  |  |
|  |  | C-3 |  |  |  |  |  |  |  |  |  |  |
|  |  | C-4 |  |  |  |  |  |  |  |  |  |  |
|  |  | C-5 |  |  |  |  |  |  |  |  |  |  |
|  |  | C-6 |  |  |  |  |  |  |  |  |  |  |
|  | Other (D) | D-1 | 0.01 | 0.01 | 0.01 | 0.01 | 0.01 | 0.01 | 0.01 | 0.01 | 0.01 | 0.01 |
| Evaluation | Film-like molded body | Perception of luminosity | 5 | 3 | 3 | 3 | 5 | 5 | 3 | 3 | 5 | 5 |
|  |  | Gloss texture | 3 | 5 | 5 | 5 | 5 | 5 | 5 | 5 | 5 | 5 |
|  |  | Color unevenness | 4 | 4 | 4 | 4 | 4 | 4 | 4 | 4 | 4 | 4 |
|  |  | Foreign substances | 1 | 4 | 4 | 2 | 4 | 4 | 4 | 4 | 3 | 3 |
|  |  | Dispersion | 1 | 4 | 4 | 3 | 2 | 2 | 2 | 2 | 4 | 4 |
|  | Injection molded body | Gloss texture | 3 | 5 | 5 | 5 | 5 | 5 | 5 | 5 | 5 | 5 |
|  | Blow molded body | Gloss texture | 3 | 5 | 5 | 5 | 5 | 5 | 5 | 5 | 5 | 5 |

TABLE 3

|  |  |  | Example 22 | Example 23 | Example 24 | Example 25 | Example 26 | Example 27 | Example 28 | Example 29 | Example 30 | Example 31 | Example 32 |
|---|---|---|---|---|---|---|---|---|---|---|---|---|---|
| Formulation | Polyolefin (A) | A-1 |  |  |  |  |  |  |  |  |  |  |  |
|  |  | A-2 |  |  | 50 | 50 | 50 | 50 | 50 | 50 |  |  |  |
|  |  | A-3 | 100 |  |  |  |  |  |  |  | 100 | 100 |  |
|  |  | A-4 |  | 100 |  |  |  |  |  |  |  |  |  |
|  |  | A-5 |  |  |  |  |  |  |  |  |  |  |  |
|  | Acid-modified polyolefin (B) | B-1 |  |  |  |  |  |  |  |  |  |  |  |
|  |  | B-2 |  |  |  |  |  |  |  |  |  |  | 100 |
|  |  | B-3 |  |  | 100 | 100 | 100 | 100 | 100 | 100 |  |  |  |
|  |  | B-4 |  |  |  |  |  |  |  |  | 50 | 50 |  |
|  |  | B-5 | 1800 | 1800 |  |  |  |  |  |  |  |  |  |
|  |  | B-6 |  |  |  |  |  |  |  |  |  |  |  |
|  | Coloring agent (C) | C-1 | 0.1 | 0.1 |  |  |  |  |  |  |  |  |  |
|  |  | C-2 |  |  | 0.1 |  |  |  |  |  |  |  |  |
|  |  | C-3 |  |  |  | 0.1 |  |  |  |  |  |  |  |
|  |  | C-4 |  |  |  |  | 0.1 |  | 0.05 |  |  |  |  |
|  |  | C-5 |  |  |  |  |  | 0.1 | 0.05 |  |  |  |  |
|  |  | C-6 |  |  |  |  |  |  |  | 0.1 |  |  |  |
|  | Other (D) | D-1 | 0.01 | 0.01 | 0.01 | 0.01 | 0.01 | 0.01 | 0.01 | 0.01 | 0.01 |  | 0.01 |
| Evaluation | Film-like molded body | Perception of luminosity | 3 | 3 | 5 | 5 | 5 | 5 | 5 | 5 | 3 | 3 | 5 |
|  |  | Gloss texture | 5 | 5 | 5 | 5 | 5 | 5 | 5 | 5 | 5 | 5 | 5 |
|  |  | Color unevenness | 4 | 4 | 4 | 4 | 2 | 4 | 3 | 3 | 4 | 4 | 4 |
|  |  | Foreign substances | 3 | 3 | 4 | 4 | 4 | 4 | 2 | 4 | 4 | 4 | 4 |
|  |  | Dispersion | 4 | 4 | 4 | 4 | 4 | 4 | 4 | 4 | 4 | 4 | 4 |
|  | Injection molded body | Gloss texture | 5 | 5 | 5 | 5 | 5 | 5 | 5 | 5 | 5 | 5 | 5 |
|  | Blow molded body | Gloss texture | 5 | 5 | 5 | 5 | 5 | 5 | 5 | 5 | 5 | 5 | 5 |

TABLE 4

|  |  |  | Comparative Example 1 | Comparative Example 2 | Comparative Example 3 |
|---|---|---|---|---|---|
| Formulation | Polyolefin (A) | A-1 |  | 100 |  |
|  |  | A-2 |  |  |  |
|  |  | A-3 |  |  |  |
|  |  | A-4 | 100 |  |  |
|  |  | A-5 |  |  | 100 |
|  | Acid-modified polyolefin (B) | B-1 |  | 50 |  |
|  |  | B-2 |  |  |  |
|  |  | B-3 |  |  |  |
|  |  | B-4 |  |  |  |
|  |  | B-5 |  |  |  |
|  |  | B-6 |  |  | 50 |
|  | Coloring agent (C) | C-1 | 0.1 | 0.1 | 0.1 |
|  |  | C-2 |  |  |  |
|  |  | C-3 |  |  |  |
|  |  | C-4 |  |  |  |
|  |  | C-5 |  |  |  |
|  |  | C-6 |  |  |  |
|  | Other (D) | D-1 | 0.01 | 0.01 | 0.01 |
| Evaluation | Film-like molded body | Perception of luminosity | 3 | 3 | 3 |
|  |  | Gloss texture | 1 | 1 | 1 |
|  |  | Color unevenness | 2 | 2 | 2 |
|  |  | Foreign substances | 4 | 2 | 1 |
|  |  | Dispersion | 1 | 1 | 1 |
|  | Injection molded body | Gloss texture | 1 | 1 | 1 |
|  | Blow molded body | Gloss texture | 1 | 1 | 1 |

As can be clearly understood from the results in Tables 1 to 3, in all of the molded bodies of Examples 1 to 32, color unevenness was low, a perception of luminosity was strong, the texture thereof had glaze and depth, and excellent pearl-like gloss (perception of luminosity) equal to or better than that of the reference example in which a pearl pigment was used was obtained. Among them, when the acid-modified polyolefin (B) was an acid-modified polypropylene having an acid value of 3 to 40 mg KOH/g, particularly excellent texture was obtained. Further, when the polyolefin (A) was an ethylene-propylene copolymer, a particularly excellent perception of luminosity and texture were obtained at the same time.

On the other hand, as can be clearly understood from the results in Table 4, the molded bodies of Comparative Examples 1 to 3 failed to allow favorable pearl-like texture to be obtained.

Priority is claimed on Japanese Patent Application No. 2015-023793, filed Feb. 10, 2015, and Japanese Patent Application No. 2015-162112 filed Aug. 19, 2015, the content of which is incorporated herein by reference.

What is claimed is:

1. A resin composition for a pearl-like molded body which is melt-kneaded and molded together with an aromatic polyester, the resin composition comprising:
    a polyolefin (other than a low-density polyethylene with a density of 0.92 g/cm$^3$ or less) and an acid-modified polyolefin, wherein the acid-modified polyolefin is included at 1300 to 1900 parts by mass with respect to 100 parts by mass of the polyolefin.

2. The resin composition according to claim 1, wherein the acid-modified polyolefin is an acid-modified polypropylene.

3. The resin composition according to claim 1, wherein the acid-modified polyolefin has an acid value of 1 to 60 mg KOH/g.

4. The resin composition according to claim 1, further comprising a coloring agent.

5. The resin composition according to claim 1, wherein the aromatic polyester is polyethylene terephthalate.

6. A pearl-like molded body obtained by molding a mixture comprising an aromatic polyester for dilution and the resin composition according to claim 1.

7. A method for producing a pearl-like molded body comprising:
    producing a pearl-like molded body by melt-kneading and molding a resin composition including a polyolefin (other than a low-density polyethylene with a density of 0.92 g/cm$^3$ or less) and an acid-modified polyolefin, and an aromatic polyester, wherein in the resin composition the acid-modified polyolefin is included at 1300 to 1900 parts by mass with respect to 100 parts by mass of the polyolefin.

8. The method for producing a pearl-like molded body according to claim 7, wherein the molding is a method selected from a group consisting of film molding, injection molding, and blow molding.

9. The method for producing a pearl-like molded body according to claim 7, wherein the aromatic polyester is polyethylene terephthalate.

* * * * *